DEFENSIVE PUBLICATION

UNITED STATES PATENT AND TRADEMARK OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent and Trademark Office makes no assertion as to the novelty of the disclosed subject matter.

PUBLISHED JUNE 1, 1976

947 O.G. 13

T947,008
SODIUM OXIDE SMOKE DETECTION
Rolv Hundal, Greensburg, Pa., assignor to Westinghouse Electric Corporation, Pittsburgh, Pa.
Filed Jan. 31, 1975, Ser. No. 546,151
Int. Cl. G01n *21/12, 21/40*
U.S. Cl. 356—114
1 Sheet Drawing. 8 Pages Specification

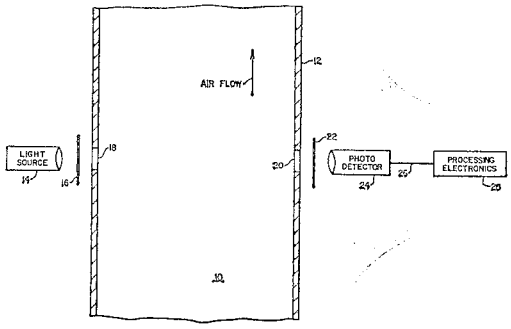

A method and apparatus for identifying the presence of sodium oxide smoke within a gas enclosure. In accordance therewith a source of light is polarized in a single plane and transmitted through the enclosure to a photodetector screened to receive only incident light having substantially the same angle of polarization as the light initially transmitted through the enclosure. Attenuation in the incident light below a given threshold is identified as being indicative of the presence of sodium oxide smoke within the gas enclosure. Alternatively, the photodetector is screened to receive incident light disorientated from the transmitted angle of polarization and an increase in the photodetector's response will correspond to an increase in concentration of sodium oxide within the gas enclosure.

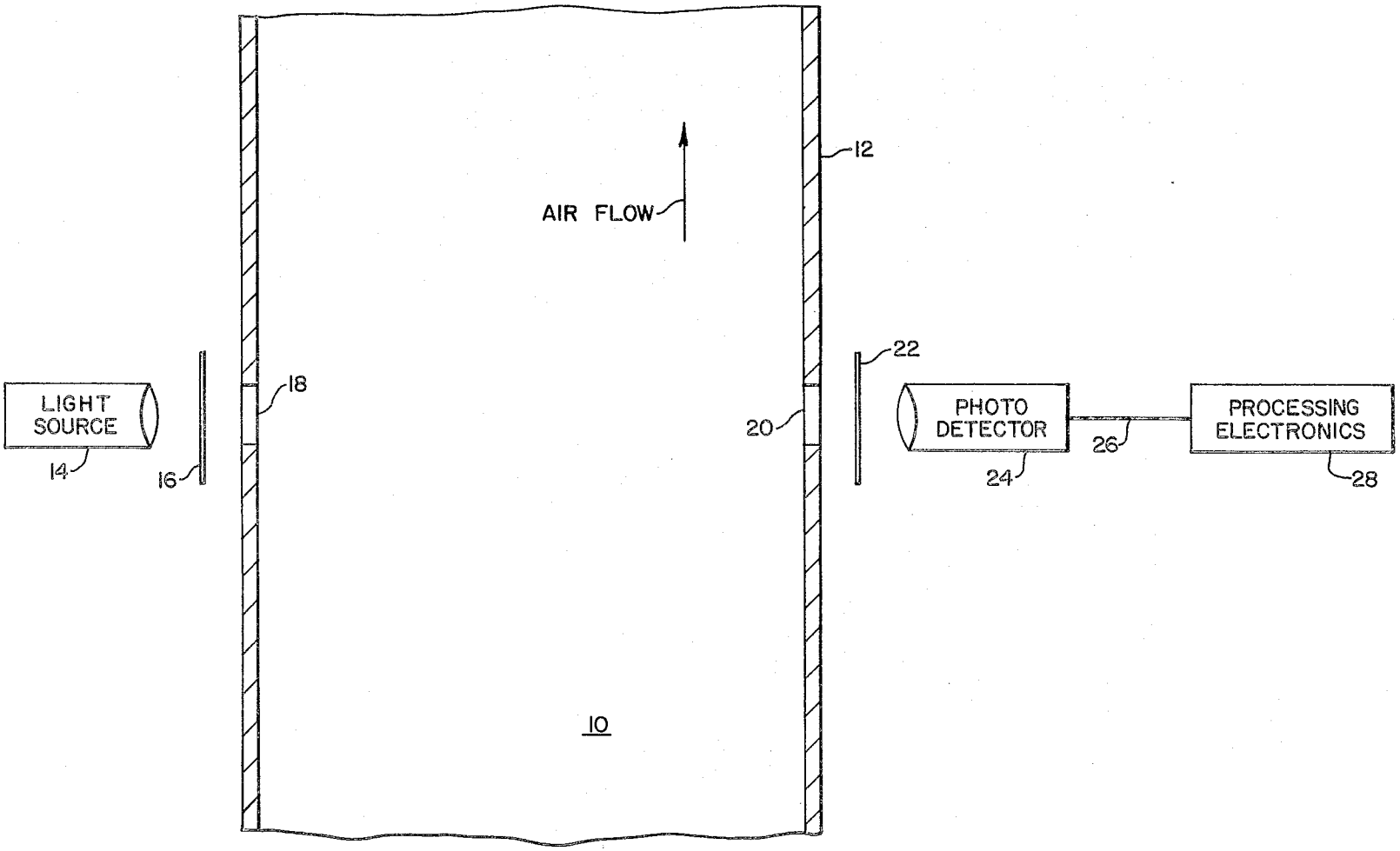

SODIUM OXIDE SMOKE DETECTION
Original Filed Jan. 31, 1975